W. H. Harn,
Tenoning Machine.
N° 2,832.  Patented Oct. 26, 1842.

UNITED STATES PATENT OFFICE.

WM. H. HARN, OF CHAMBERSBURG, PENNSYLVANIA.

MACHINE FOR CUTTING TENONS.

Specification of Letters Patent No. 2,832, dated October 26, 1842.

*To all whom it may concern:*

Be it known that I, WILLIAM H. HARN, of Chambersburg, in the county of Franklin and State of Pennsylvania, have invented a new and useful Machine for Cutting Tenons on Wood; and I do hereby declare that the following is a full and exact description thereof.

Between two upright posts, I place a sliding plane, that works up and down in grooves, like a saw-frame, between fender posts. This plane operates like a fillester, or a raising plane, having a skew iron, and a cutting tooth for forming the shoulder; its face must be as wide as the length of the longest tenon which it is intended to cut. The plane is to be worked up and down, either by means of a treadle, or of a hand lever, in the same way in which a chisel is generally operated in mortising machines. For ordinary purposes in carpentry, the stroke of the plane may be eleven, or twelve, inches, or such as will suffice for the lock rail of a door; and it should be capable of cutting to a depth of about three fourths of an inch; all which, however, may be regulated at pleasure. To hold the stuff while being tenoned, it is borne against by a set screw, and is also embraced by a clip, holdfast, or sliding frame, of iron, or of steel, by which it is drawn up, and held close, against a sliding block in front of the plane; the face of which block is made perfectly flat and true. This sliding block is to be moved back and forth by means of a screw, furnished with a hand wheel, or winch, for turning it. In this machine, the stuff is cut more advantageously than in those which have heretofore been used for the forming of tenons, the cutting being effected on the face of the stuff, and upon the whole length and width of the tenon at the same time; by which means it is not only effected more quickly, but a better shoulder, a smoother face, and more perfect edges are left than can be done when the cutting takes place at the end.

Figure 1:
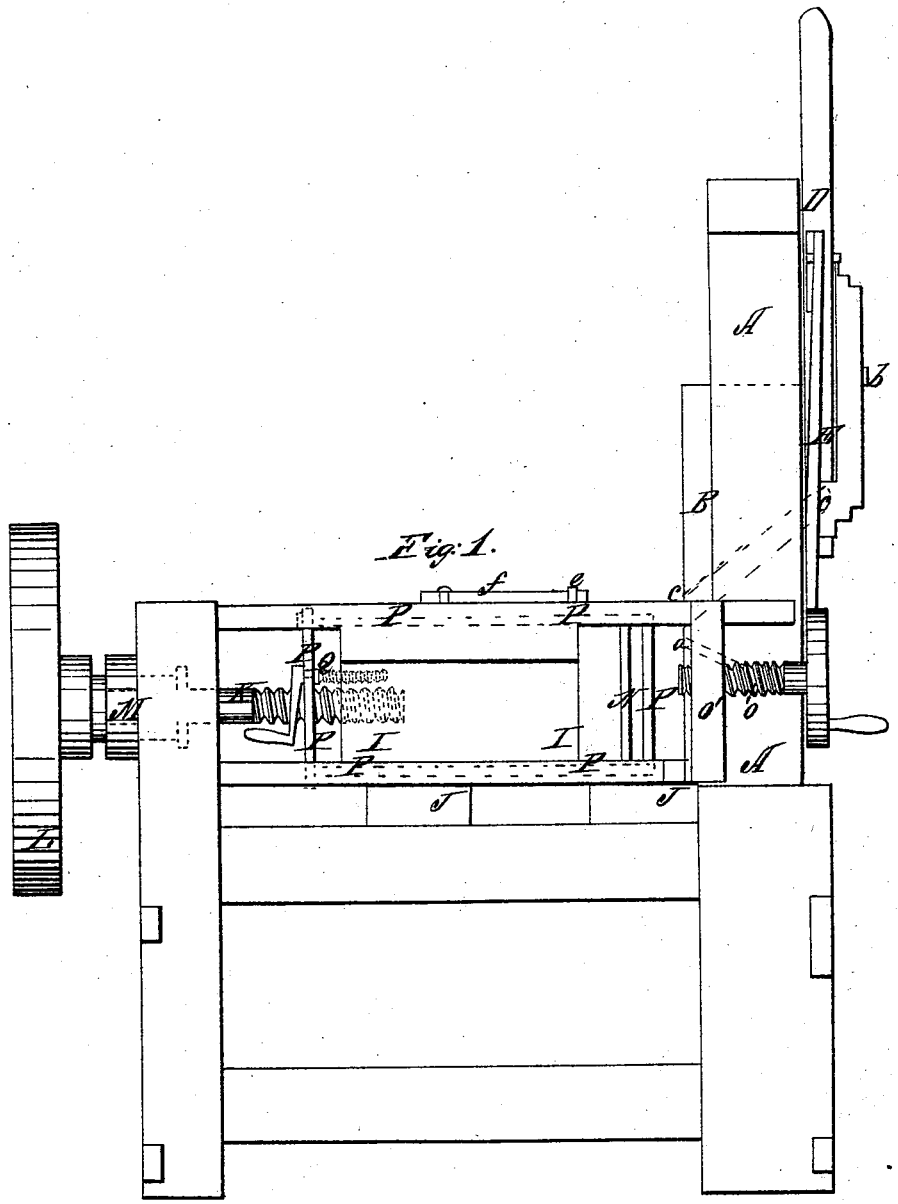
Figure 2:
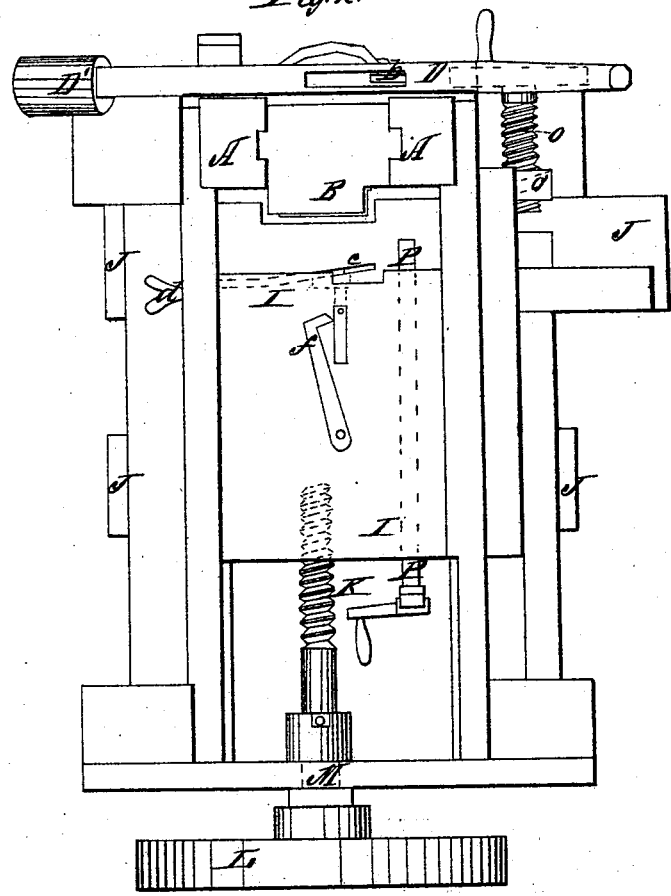

In the accompanying drawing Figure 1, is a side elevation, and Fig. 2, a top view, of the machine.

A, A, are the side, or fender posts; B, B, the plane, of which C, is the iron, and *a*, the tooth for cutting the shoulder.

D, D, is a hand lever, working on a fulcrum at *b*, and carrying a connecting rod E, attached to the lever D, at its upper, and to the plane stock at its lower, end. When this hand lever is used, the plane may be brought up by a weight appended to its end D', in a manner well known; but the plane may be actuated by a treadle, or by a crank, if preferred.

I, I, is the sliding block, which rests on the plank J, J, beneath it. The block is moved back and forth by means of the screw K, which is tapped into it; L, is a hand wheel attached to the outer end of the screw K, and by which the screw is turned, its outer end being embraced by a collar at M. The stuff to be tenoned, is introduced at the trough, or opening, N, and passes in between the face of the plane, and the end of the sliding block I. When the piece to be tenoned is in place, it is held there by the screw O, which is tapped through the piece O', said piece being made fast to, and constituting a part of, the sliding block I.

P, P, is the iron, or steel, clip, or sliding frame, which passes around the piece to be tenoned, embracing it on that side which is toward the plane, and near to where the shoulder is to be formed. The width of this iron sliding frame, must, of course, be such as to enable it to receive a lock rail, or such other piece of the widest kind that is to be tenoned.

Q, is a screw which is tapped into a nut in the sliding block I, and this screw passes through, and swivels in, a collar at P', on the rear end of the iron sliding frame P. By turning this screw, the clip, or sliding frame, P, is brought up against the piece which has been passed through it, and it is thereby held firmly against the face of the sliding block I; and is further retained by means of the screw O.

To gage the stuff, when one side of the tenon has been cut, I insert a piece of metal, as shown at *c*, in the face of the sliding block I; this piece is attached to a slide that is worked back and forth to the requisite distance, by a thumb screw, *d*, at one side of the block I. The sliding piece is made to spring out, so as to cause the piece *c*, to project beyond the face of the block I, and, consequently, to bear upon a shoulder on that side of the piece which has been tenoned; and by shifting the slide to which the gage piece, *c*, is attached, one side of the tenon may be cut longer than the other, should the nature of the framing require it: *e*, is a pin that may be drawn back, and held by the hook $f$: the pin $e$, is connected with the piece $c$, or to the spring piece to which it is fastened, by means of a staple, and is thus made to draw the piece $c$, back within the face of the block I, when desired.

Having thus, fully described the nature of my invention, and shown the manner in which my tenoning apparatus operates, what I claim therein as new, and desire to secure by Letters Patent, is—

1. The manner of the constructing said machine under the particular arrangement of the respective parts as herein set forth and represented; that is to say, a machine in which the tenon is cut by means of a vibrating plane, formed in the manner of a fillester, or raising plane; and in which the stuff is held against the face of a sliding block, by means of a frame, or hold-fast, of steel, or of iron; the apparatus being formed and operating in such manner as that the cutting shall be effected on the side of the stuff, as set forth.

2. I claim, also, the manner of combining, and operating, the hold-fast, for the purpose herein made known.

3. I likewise claim the manner of gaging the shoulder of the tenon, by means of the adjustable gage piece, $c$; the whole instrument being constructed and arranged substantially as herein described.

WM. H. HARN.

Witnesses:
  THOS. P. JONES,
  EDWIN L. BRUNDAGE.